United States Patent [19]

Merrill et al.

[11] Patent Number: 4,856,199

[45] Date of Patent: Aug. 15, 1989

[54] SINGLE CONTACT POINT DISTANCE MEASURING FOR PLANE DETERMINATION

[75] Inventors: Marcellus S. Merrill, Denver; Thomas B. Chapin, Lakewood, both of Colo.

[73] Assignee: Merrill Engineering Laboratories, Inc., Englewood, Colo.

[21] Appl. No.: 15,923

[22] Filed: Feb. 18, 1987

[51] Int. Cl.$^4$ .................... G01B 21/26; G01B 5/24
[52] U.S. Cl. .................. 33/203.17; 33/203.15; 33/203.21; 33/558
[58] Field of Search ............... 33/203, 203.12, 203.13, 33/203.15–203.21, 503, 556–561

[56] References Cited

U.S. PATENT DOCUMENTS

| | | | |
|---|---|---|---|
| 1,450,518 | 4/1923 | Schwartz | 33/203.19 |
| 1,589,048 | 6/1926 | Bussard | 33/203.20 |
| 1,959,642 | 5/1934 | Phelps | 33/203.15 |
| 3,023,511 | 3/1962 | Castiglia | 33/203.15 |
| 3,116,562 | 1/1964 | Hunter | 33/203.17 |
| 3,417,479 | 12/1968 | Hirmann | 33/203.17 |
| 3,460,264 | 8/1969 | Cluchey | 33/203.17 |
| 3,546,782 | 12/1970 | Pereue et al. | 33/203.13 |
| 3,855,709 | 12/1974 | Hirmann | 33/203.15 |
| 4,099,333 | 7/1978 | Forster | 33/203.12 |
| 4,457,075 | 7/1984 | Murata | 33/203.15 |

*Primary Examiner*—William A. Cuchlinski, Jr.
*Assistant Examiner*—Patrick R. Scanlon
*Attorney, Agent, or Firm*—Sheridan, Ross & McIntosh

[57] ABSTRACT

Apparatus and method are provided for use in determining information relating to the plane of rotation of an object, particularly a vehicle wheel. The apparatus includes a probe that is maintained at the same contact point relative to the wheel during the rotation of the wheel. The position of the probe is monitored and position-related data is analyzed by a processing system. The processing system implements a least squares method for defining the plane of rotation utilizing a number of the position-related data points, which were obtained during rotation of the wheel. In one embodiment, the probe is connected to a pivotable wobble plate for use in maintaining a predetermined position of the probe relative to the wheel during rotation thereof. A carriage assembly also acts to maintain the predetermined position of the probe. In another embodiment, instead of a carriage assembly, rotatable arms and counter-weight are employed so that the probe moves as a direct result of rotation of the wheel. The apparatus relies solely on information received from the single wheel to determine the plane of rotation of the wheel and does not require translational movement of the wheel in making this determination.

42 Claims, 9 Drawing Sheets

4,856,199

SINGLE CONTACT POINT DISTANCE MEASURING FOR PLANE DETERMINATION

FIELD OF THE INVENTION

The present invention relates to a method and apparatus for use in determining the plane of rotation of an object and, in particular, to a method and an apparatus for use in determining the plane of rotation of an automobile wheel or tire useful in alignment thereof.

BACKGROUND OF THE INVENTION

In a number of instances in which the wheel rotates on an axle, it is desirable to accurately determine the plane of rotation of the wheel, i.e. that plane which is defined by the circular locus of points traced by a particular point on the wheel as the wheel rotates. The orientation of this plane is uniquely defined using the axis of rotation of the wheel, i.e. an imaginary line perpendicular to the plane and passing through every diameter of the circular locus. Determination of the wheel plane is of use in connection with aligning the wheels of a multi-wheeled vehicle, e.g. motor vehicles such as automobiles, trucks and the like. Optimum performance of such vehicles is obtained when the wheels are positioned in a predetermined alignment, typically specified by the manufacturer in terms of toe, camber, caster and other angles. The toe and chamber angles specified by the manufacturers refer to preferred alignments of the plane of rotation of the wheel. Deviations greater than the recommended tolerance from the preferred alignment can result in poor handling and damage or excessive wear to the tires or other parts of the vehicle. It is evident, therefore, that is useful to be able to determine the orientation in space of each of the vehicle wheels, e.g., with respect to a reference plane or point. In this manner, it is possible to determine whether a vehicle is in accord with recommended alignment parameters and, during processes of adjusting such parameters, whether correct adjustment has been achieved.

To be useful in measuring and adjusting wheel alignment, methods and apparatus for measuring wheel planes must have a high degree of accuracy, and at least sufficient accuracy to assure that the maximum measurement error is no more than the recommended tolerance. At the same time, practical considerations dictate that wheel plane determination methods and apparatus do not require excessive space or time to operate. In the past, some amount of accuracy was sacrificed in order to minimize time or space or achieve other goals such as portability. U.S. Pat. No. 3,460,264, issued Aug. 12, 1969 to Clutchy, discloses a portable wheel alignment checking device having portions which engage areas of two opposed wheels and remain adjacent to those areas as the vehicle is moved to accomplish one rotation of the wheels. This device, however, gauges relative spacing of areas on opposed wheels and does not directly provide information on the wheel plane of a single wheel relative to a reference point or plane. U.S. Pat. No. 1,589,048, issued June 15, 1926 to Bussard, and U.S. Pat. No. 3,116,562, issued Jan. 7, 1964 to Hunter, both relate to obtaining measurements of distances between two wheels at a number of points along the wheel or tire. Neither of these references relates to measuring the plane of rotation of a single wheel relative to a reference point or plane. Other apparatus measures three points on a wheel simultaneously to define a plane. However, such apparatus is affected by both local aberrations such as small bulges on the tire or raised lettering and by systematic aberrations such as run-out, i.e., non-perpendicularity of the wheel with respect to the axle on which the wheel is mounted. This apparatus also provides too few data points per application to be practical for forming any statistical measure of reliability of the data. Another known apparatus determines the position of a number of points in a small region of the tire, taking the average of these points as an indication of the true position in space of a point on the tire. However, mere averaging does not provide a statistical measure of the reliability of the data and the apparatus, in practical terms, can provide only a finite number of data points.

Accordingly, it would be advantageous to provide a method and apparatus which can provide information on the orientation in space of the plane of rotation of a single wheel relative to a reference point or plane while requiring only a small physical space to operate and requiring little operator time for set up, orientation of the apparatus with respect to the vehicle, or other operating procedures. It also would be advantageous to provide a method and apparatus which can generate a statistical measure of the reliability of the data it has produced and which is capable of generating any number of data points needed to achieve a predetermined reliability of data.

SUMMARY OF THE INVENTION

The present invention relates to positioning a single probe in contact with or adjacent to a point on a single wheel and maintaining that probe in the same position relative to the wheel as the wheel is rotated. The output of the probe provides a locus of points traced by the wheel point as the wheel rotates. By providing for continuous monitoring of the probe position, a potentially infinite number of data points can be obtained. In this manner, a statistical measure of the reliability of the data obtained, e.g. a least squares fit, can serve as a criterion for reliability of the data. From the accumulated, reliable data, information relating to the plane of rotation of the wheel can be found, which is then used in determining the toe and camber angles of the wheel.

More particularly, in a first embodiment, the invention includes a probe assembly having a probe with a tip that is in contact with a single point of the wheel. The probe assembly also includes a wobble plate to which the probe is connected. Pivotal movement of the wobble plate is detected using a sensor assembly. The sensor assembly communicates with processing hardware and software. The processing system controls movement of X, Y carriages. During rotation of the wheel, the processing system acts to control movement of the X, Y carriages so that the probe is maintained at the same contact point on the wheel. During operation, the sensor assembly and the processing hardware and software are able to determine a number of positions of the single contact point of the probe relative to a reference plane. Using at least three such points, information can be determined relating to the plane of rotation of the wheel. This information is subsequently used to determine toe and camber angles. During operation, the reliability of the positional data is checked to insure the accuracy of the information relating to the wheel's plane of rotation.

In another embodiment of the invention, instead of X, Y carriage movement being used to maintain the probe at the desired position relative to the wheel, an arm assembly is utilized. The arm assembly includes a first arm to which the probe having a first longitudinal axis is mounted. The first arm pivots about a second axis parallel to but spaced from the longitudinal axis of the probe. The first arm pivots around the second axis with respect to a second arm. The second arm, in turn, pivots around a third axis which is spaced from but parallel to the second axis. The second arm is pivotally connected to a fixed base member so as to pivot around the third axis. The arms are preferably provided with counterweights to maintain the apparatus in balance around each of the second and third axes. During movement of the wheel, the probe is able to move therewith due to the movement of the first and second arms. At each of a number of points during movement of the wheel, the angles of the second arm relative to the base and the first arm relative to the second arm are obtained. Using this information, as with the first embodiment, the toe and camber angles of the wheel can be determined. The actual toe and camber angles can then be adjusted to provide a correspondence between the actual angles and the desired toe and camber angles.

In view of this summary, a number of objectives of the present invention are immediately recognized. A wheel aligning apparatus is disclosed for providing accurate and reliable information associated with determining toe and camber angles of a wheel. Unlike other known machines that rely on information using a single wheel, a bent wheel, or other deformity that can cause wheel wobble or run-out, will not lead to an inaccurate wheel plane determination because only one contact point on the wheel is used. Relatedly, unlike some prior art devices, only data from a single wheel need be obtained in order to determine the plane of rotation of that wheel. Furthermore, unlike prior art devices that utilize two wheels in obtaining wheel planedetermining data, only rotational movement of the wheel is required, and not translational movement of the wheel. Such features are achieved in the present invention by maintaining the probe at a single location or contact point relative to the wheel during its rotational movement. Additionally, the reliability of the measured information is enhanced by use of statisticalrelated techniques.

Additional advantages of the present invention will become readily apparent from the following discussion when taken in conjunction with the accompanying drawings.

DETAILED DESCRIPTION OF PREFERRED EMBODIMENTS

The present invention relates to method and apparatus for use in determining information relating to the plane of rotation of a wheel, such as an automobile wheel or tire. According to the present invention, a probe is placed in contact with or adjacent to a point on the wheel and it is maintained at that position as the wheel is rotated.

Figure 1:
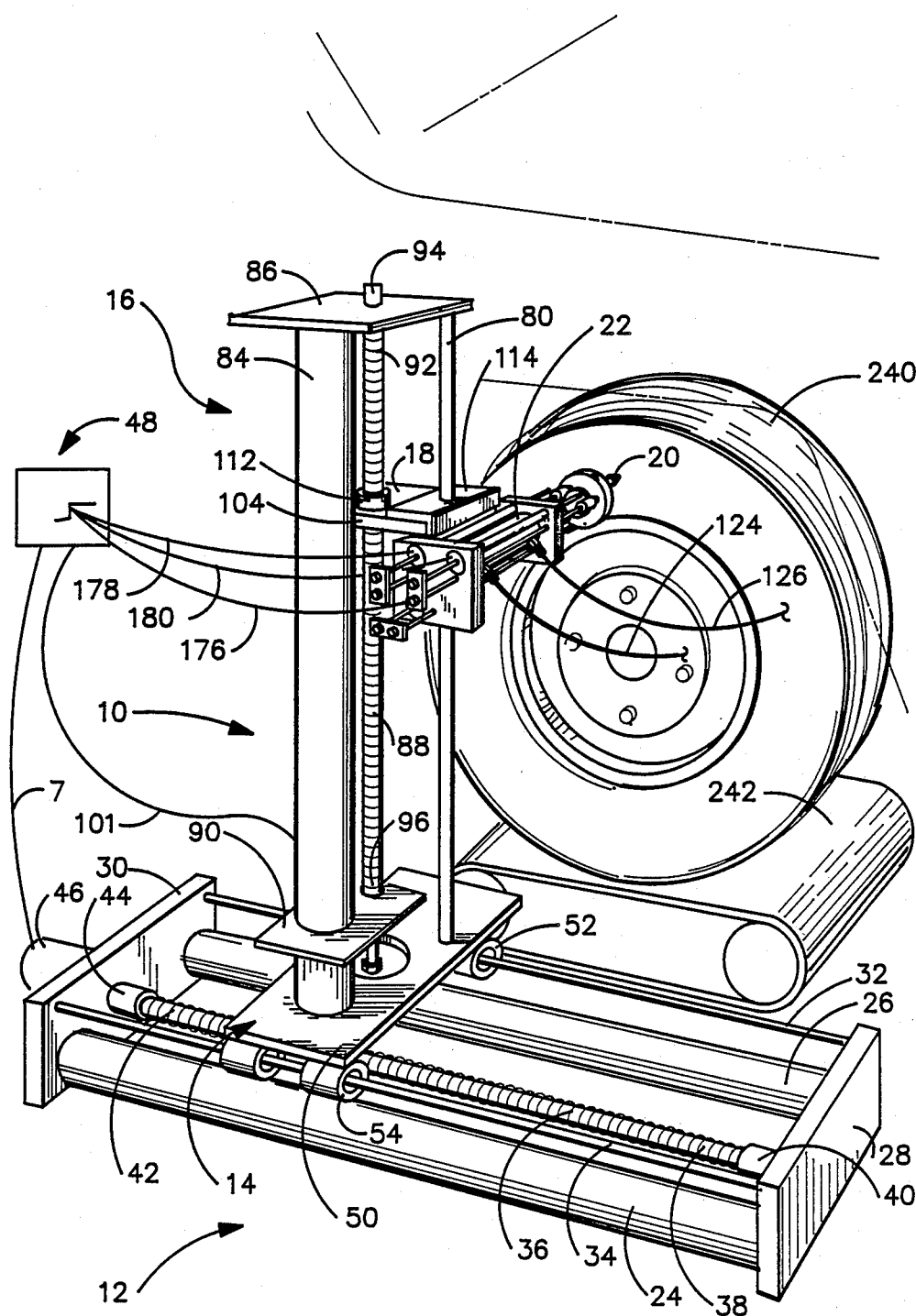
FIG. 1 is a perspective view of apparatus of the present invention in operative engagement with an automobile tire.

With regard to a first embodiment of the invention, the probe is maintained at the wheel point using carriages and motors which are used in maintaining the position of the probe as the wheel rotates. Referring now to FIG. 1, the wheel plane measurement device 10 comprises a base or bed 12 having a first carriage 14, an elevator 16 having a second carriage 18 and a probe 20 connected to the second carriage by means of a sensing assembly 22. As more fully described below, the two carriages 14, 18 and the sensing assembly 22 cooperate to move the probe 20 in three preferably orthogonal directions while monitoring movement of the probe 20 to determine its position in space with respect to a reference plane.

The reference plane can be defined using a known, fixed placement of the measurement device 10. In one embodiment, when the measurement device 10 is intended for determining the plane of rotation of an automobile wheel or tire, the reference plane is found using the positions of the wheels of the vehicle. Preferably, a measurement device 10 is provided for each wheel of the vehicle. Each measurement device 10 can provide the orientation in space of the plane of rotation of the corresponding wheel with respect to the known position of the measurement device. The reference plane is defined using the rotation axes of the drive wheels. The wheel planes of the remaining wheels are measured with respect to this reference plane.

The bed 12 includes two parallel frame tubes 24, 26, the ends of which are rigidly attached to perpendicular end plates 28, 30. Extending between the end plates 28, 30 are two rigid parallel guide rods 32, 34 and a worm-threaded drive shaft 36. One end of the drive shaft 36 is a free end 38, rotatably mounted in a bushing 40. The other end of the drive shaft 36 is a driven end, and extends through a bushing 44 and through the end plate 30 to operatively connect to the shaft of an electric motor 46. The motor 46 has a shaft encoder, the output 47 of which communicates with an electronic apparatus 48 and which, preferably, includes a microcomputer. The electronic apparatus 48 is used to monitor shaft rotation whereby the amount and direction of movement of the first carriage 14 is monitored.

Figure 2:
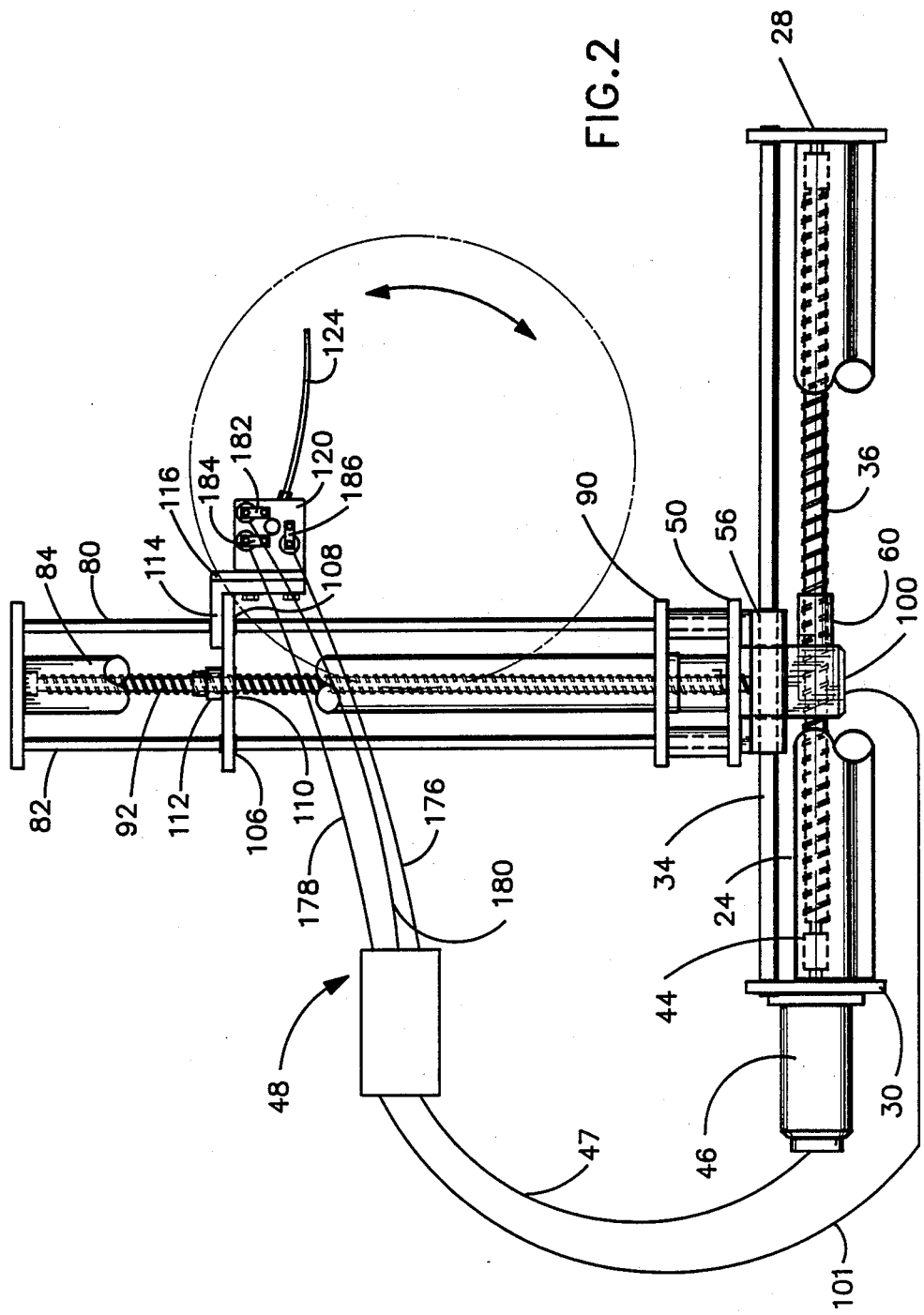
FIG. 2 is a front elevational view of the apparatus of FIG. 1 with portions of a frame tube cut away.
Figure 3:
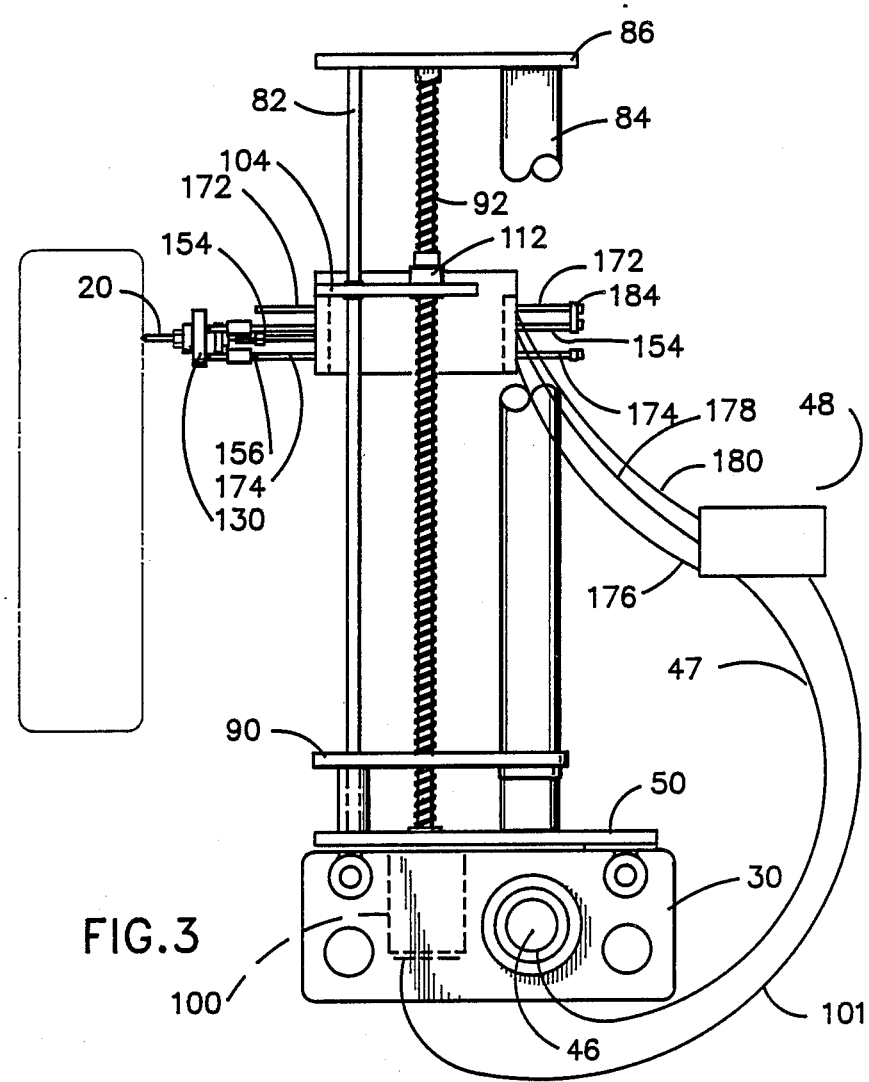
FIG. 3 is a side elevational view of the apparatus of FIG. 1 with portions of a frame tube cut away.

The first carriage 14 includes a base plate 50 fixedly attached to guide tubes 52, 54 which are parallel to and enclose the guide rods 32, 34. With reference also to FIG. 2, inside each of the guide tubes 52, 54 is a bushing 56 in close engagement with the guide rods 32, 34 to permit the first carriage 14 to slide longitudinally parallel to the guide rods 32, 34 with a minimum of play or deviation from straightline longitudinal movement. Also fixedly attached to base plate 50 is an internally threaded cylinder or nut 60 operatively engaged with the threads of the wormthreaded drive shaft 36. Any rotation of the drive shaft 36 will thus cause the nut 60 to longitudinally travel along the drive shaft 36 and, in turn, cause the first carriage 14 to move longitudinally parallel to the guide rods 32, 34.

The elevator 16 is rigidly mounted to the first carriage 14 such that two elevator guide rods 80, 82 are at an angle to and preferably orthogonal to the parallel bed guide rods 32, 34. The elevator 16 includes a frame tube 84 extending between and perpendicular to the first carriage base plate 50 and an end plate 86. The guide rods 80, 82 also extend between the first carriage base plate 50 and the end plate 86. A worm-threaded drive shaft 88 extends between the end plate 86 and an intermediate plate 90 which is substantially parallel to the first carriage base plate 50. The drive shaft 88 has a free end 92 extending through and rotatably attached to the end plate 86 by a bushing 94. The opposite end of the drive shaft 88 is a driven end 96 which extends through and is rotatably connected with the intermediate plate 90 and is operably connected with the drive shaft 98 of a motor 100. The motor 100 also has a shaft encoder, which communicates 101 with the electrical apparatus 48.

The second carriage 18 includes a base plate 104 having two holes 106, 108 in close engagement with the guide rods 80, 82. The base plate 104 thus slides linearly parallel to the guide rods 80, 82 with substantially no play or deviation from parallelism of movement with the guide rods 80, 82. The base plate 104 also has a hole 110 coaxial with an internally threaded cylinder or nut 112. The nut 112 is fixedly attached to the base plate 104 and the threads thereof are operatively engaged with the worm threads of the drive shaft 88 such that when the drive shaft 88 is rotated, the nut 112 and the carriage 18 attached thereto moves longitudinally in a direction parallel to the guide rods 80, 82.

Figure 4:
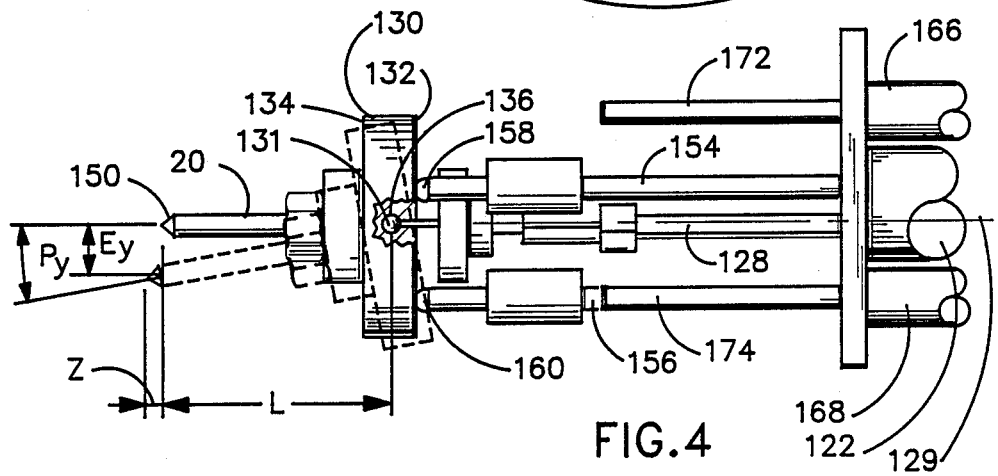
FIG. 4 is a partial side elevational view of the apparatus of FIG. 1 showing the probe and partially cut away wobble plate of the sensor assembly with the probe and wobble plate in a displaced position shown in phantom lines.
Figure 6:
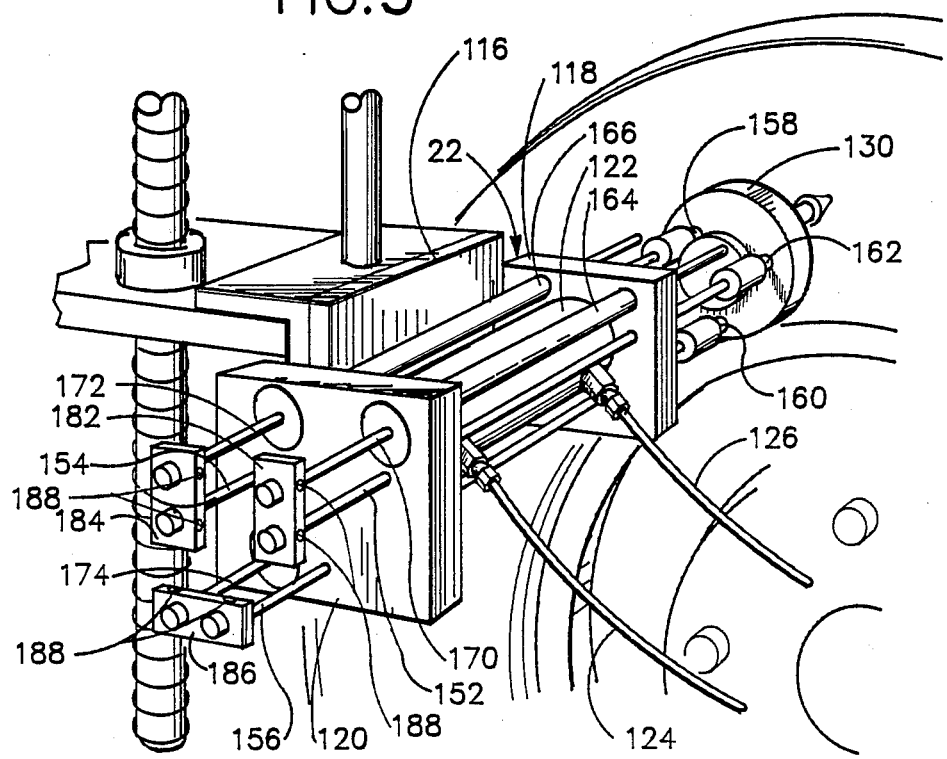
FIG. 6 is a partial perspective view of the apparatus depicted in FIG. 1 showing more detail of the sensor assembly.

An L-shaped plate 114 is attached to the second carriage base plate 104. The sensor assembly 22 is attached to the L-shaped plate 114. As best seen in FIG. 6, the sensor assembly 22 includes a side plate 116 fixedly attached to and perpendicular to first and second end plates 118, 120. A compressed air positioning device 122, which is controlled using compressed air control lines 124, 126, extends between the end plates 118, 120. The positioning device 122 controls movement of a plunger 128, as best seen in FIG. 4, which is tiltably connected to a wobble plate 130 by, e.g., a ball and socket arrangement 136. The longitudinal axis of the plunger 128 defines the wobble plate tilting axis 128. The tilting point or center of play 131, about which the wobble plate 130 tilts, lies at the center of the ball and socket 136, on the tilting axis 129. The wobble plate 130 has a first surface 132 and a second surface 134. Projecting from the second surface 134 of the wobble plate 130 is the probe 20. The probe 20 has a longitudinal axis which preferably passes through the center of the wobble plate 130. The probe 20 can be mounted on the wobble plate 130 so as to substantially prevent rotation of the probe 20 about its longitudinal axis, with respect to the wobble plate 130. The probe 20 terminates in a pointed end defining a tip or contact point 150. First, second and third parallel detector rods 152, 154, 156 extend through tight-fitting holes in the end plates 120, 118. The ends of the detector rods 152, 154, 156 which are adjacent to the wobble plate 130 are attached thereto by ball and socket joints 158, 160, 162, defining three points of attachment of the detector rods 152, 154, 156 with the inside surface 132 of the wobble plate 130. These three points of attachment 158, 160, 162 are preferably arranged so as to define an equilateral triangle centered about the ball and socket arrangement 136. In this way, when the wobble plate 130 tilts about the central ball and socket 136, such tilting causes movement of one or more of the detector rods 152, 154, 156 in directions along the longitudinal axes of the detector rods.

Each of three linear variable differential transformers (LVDT) 164, 166, 168 extends between the end plates 120, 118 parallel to the detector rods 152, 154, 156. Each LVDT 164, 166, 168 produces an electrical signal indicative of the displacement of LVDT shafts 170, 172, 174. These displacement signals 180, 178, 176 from each LVDT 164, 166, 168 are sent to the electrical apparatus 48. The LVDT 170, 172, 174 extend through and outward of the end plates 120, 118. The ends of the LVDT shafts 170, 172, 174, which extend outward of the second end plate 120, are attached to the corresponding ends of the detector rods 152, 154, 156 by rod end brackets 182, 184, 186 and are secured using set screws 188.

Figure 7:
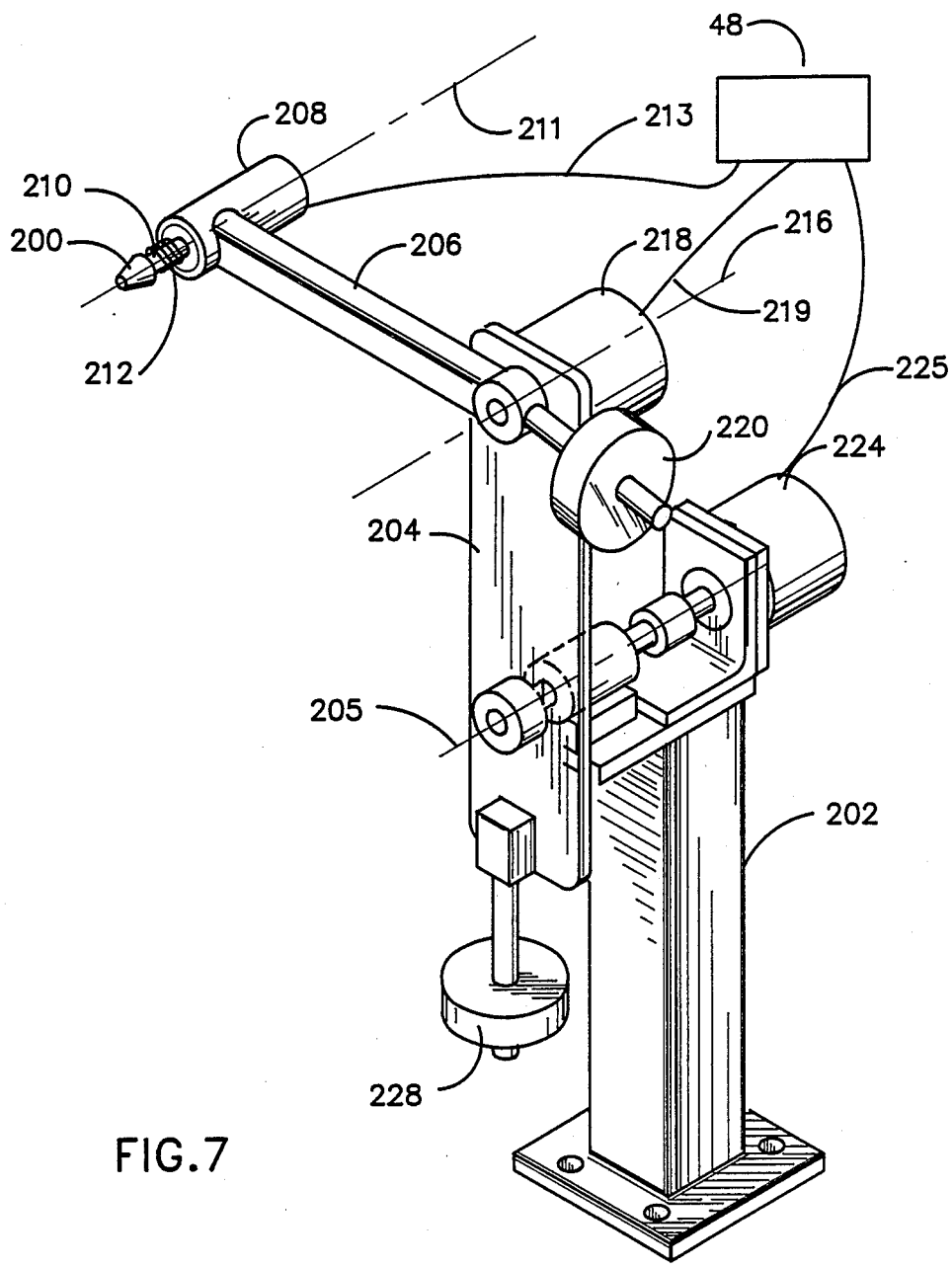
FIG. 7 is a perspective view of a second embodiment of the invention.

In a second embodiment of the invention, depicted in FIG. 7, movement of a probe 200 during rotation of the wheel is directly affected by wheel rotation, rather than being controlled using motors. The apparatus, according to this second embodiment, comprises a pedestal or base 202, a major arm 204 pivotally connected to the base along a first axis 205, a minor arm 206 pivotally connected to the major arm 204, and having an LVDT 208 attached to one end of the minor arm 206. The probe 200 is attached to the shaft 210 of the LVDT preferably such that the longitudinal axis 211 of the probe 200 is coaxial with the longitudinal axis of the LVDT shaft 210. A biasing device such as a spring 212 is operatively connected to the probe 200 to urge the probe 200 in a direction along its longitudinal axis away from the LVDT 208. The LVDT 208 produces an electrical signal 213 indicative of the longitudinal displacement of the probe 200 along its longitudinal axis. This electrical signal is transmitted to an apparatus for processing purposes 48.

The first or minor arm 206 is pivotally connected to the second or major arm 204 so as to pivot with respect to the second arm 204 about a second axis 216 which is parallel to but spaced from both the first axis 205 and the longitudinal probe axis or third axis 211. A first encoder 218 produces an electrical signal 219 indicative of the angle between the first arm 206 and the second arm 204. Specifically, the first arm 206 has a longitudinal axis which passes through the second and third axes 216, 211. The second arm 204 has a longitudinal axis which passes through the second axis 216 and the first axis 205. The first encoder 218, then, provides a signal 219 which is indicative of that angle formed by the projection of the longitudinal axes of the first and second arms 206, 204 on a plane perpendicular to the first, second and third axes 205, 216, 211. The signal 219 indicative of the angle between the first and second arms 204, 206 is sent to the electrical apparatus 48.

The end of the first arm 206 opposite to the probe-bearing end is provided with an adjustable counterweight 220 positioned so that the first arm 206 is balanced with respect to the second axis 216.

The base 202 is preferably fixedly attached to the floor in a known position. Known geometric relationships can be used to relate angles or distances measured with respect to the known position of the base 202 to angles or measurements with respect to the reference plane. As in the first embodiment, the reference plane is preferably defined using the measured axes of rotation of the drive wheels of the vehicle. A second encoder 224 produces an electrical signal 225 which is indicative of the angle between the longitudinal axis of the second arm 204 and the longitudinal axis of the base 202, i.e. a vertical line passing through the first axis 205. Specifically, the encoder 224 provides a signal relating to or indicative of the angle between the projections of the longitudinal axes of the second arm 206 and the base 202 on a plane which is perpendicular to the first, second and third axes 205, 216, 211. The signal 225 from the second encoder 224 is also transmitted to the electrical apparatus 48.

The second arm 204 is provided with an adjustable counterweight 228 positioned so that the second arm 204 is balanced with respect to the first axis 205.

The manner of using the embodiment depicted in FIGS. 1-6 will now be discussed. Before conducting any measurement of the plane of rotation of a wheel, the apparatus is preferably adjusted and calibrated such that the longitudinal axis of the probe 20 is in a preferred orientation and each LVDT 164, 166, 168 produces a null or zero output. Although any orientation of the longitudinal axis of the probe 20 can be operable, it is preferred to align the probe 20 so that its longitudinal axis is substantially perpendicular to the anticipated wheel planes and most preferably so that the longitudinal axis of the probe 20 is in a predetermined position or orientation substantially perpendicular to the elevator guide rods 80, 82 and to the bed guide rods 32, 34. As described above, any tilt or wobble of the wobble plate 130 about the central ball and socket 136 causes longitudinal movement of the detector rods 152, 154, 156. Similarly, movement of the detector rods 152, 154, 156 will cause a tilt or wobble of the wobble plate 130. To adjust the probe 20 in a preferred orientation, the detector rods 152, 154, 156 are moved along their longitudinal axes to tilt the wobble plate 130 to a position in which the longitudinal axis of the probe 20 (which is orthogonal to the second surface 134 of the wobble plate 130) is in the desired orientation.

In order that each LVDT 164, 166, 168 yield a null or zero reading whenever the probe 20 is in the preferred orientation, the set screws 188 of the end rod brackets 182, 184, 186 are loosened. The LVDT shafts 170, 172, 174 are then individually adjusted, i.e. moved along their longitudinal axes, until each LVDT 164, 166, 168 yields a null or zero reading. The set screws 188 are then tightened so that the LVDT rods 170, 172, 174 are rigidly linked to the detector rods 152, 154, 156. The detector rods 152, 154, 156 thereby provide a linkage between three points of the wobble plate 130 and each LVDT 164, 166, 168. If the probe 20 moves from its preferred orientation, such movement will cause a tilt of the wobble plate 130 about its central ball and socket 136. This tilting of the wobble plate 130 will in turn cause movement of one or more of the detector rods 152, 154, 156. This movement of the detector rods 152, 154, 156 will be equal to the displacement of each of the three contact points 158, 160, 162 of the wobble plate 130 from the preferred plane of orientation of the wobble plate 130. The displacement of the detector rods 152, 154, 156 in turn, by means of the rod end bracket linkages 182, 184, 186, causes longitudinal displacement of respective LVDT shafts 170, 172, 174. Movement of such LVDT shafts 170, 172, 174 produces signals 180, 178, 176 that relate to the displacements of the respective wobble plate contact points 158, 160, 162 from the preferred position of these points. The signals 176, 178, 180 can be used to determine the difference between the actual orientation of the longitudinal axis of the probe 20 and the preferred orientation of the longitudinal axis of the probe 20.

As an example of the manner of conducting this determination, it is assumed that the preferred orientation of the probe 20 is horizontal, i.e., perpendicular to the elevator guide rods 80, 82 and perpendicular to the bed guide rods 34, 36 and the wobble plate contact points 158, 160, 162 form an equilateral triangle centered about the wobble plate tilting axis 129 with the first and third contact points 158, 162 lying in the same horizontal plane. When the probe 20 is moved so that its longitudinal axis is at an angle to the preferred longitudinal axis, one or more of the LVDTs 164, 166, 168 will provide a signal indicative of the horizontal displacement of one or more of the wobble plate points 158, 160, 162, respectively. The new angle of the longitudinal axis of the probe 20 can thus be defined by two angles, denoted $P_x$ and $P_y$, where $P_x$ is the angle between the projections of the actual and preferred orientations of the longitudinal axis of the probe 20 on a horizontal plane, and $P_y$ is the angle between the actual and preferred orientations of the probe 20 on a vertical plane. Although the discussion below involving angles $P_x$ and $P_y$ is useful for a clear understanding of the invention, in the preferred embodiment the angles $P_x$ and $P_y$ are never calculated or measured directly; rather, the known geometry of the probe 20 and points of attachment 158, 160, 162 can be combined with distances indicated by the LVDT's 170, 172, 174, in a manner described below.

Following adjustment and calibration of the apparatus as just described, the wheel or tire 240, whose orientation plane is to be measured, is positioned adjacent to the measurement device 10. The wheel 240 is operatively connected to a wheel rotating device, such as a treadmill 242, rollers or the like. In another embodiment, dynamic rollers are used to contact and rotate the tire 240 so as to provide a null force on the tire 240. Such dynamic rollers are disclosed in U.S. Pat. No. 3,187,440 entitled "Dynamic Wheel Alignment Testing Apparatus." The first and second carriages 14, 18 are moved to position the probe 20 in the vicinity of a point on the wheel. The air control lines 124, 126 are used to activate the positioning device 122 so as to move the probe 20 towards the wheel 240 placing the contact point 150 adjacent to and in firm contact with a point on the wheel 240. The wheel 240 is then rotated about its axis of rotation. In order to permit an accurate determination of the plane of rotation of the wheel 240, two goals must be achieved during rotation of the wheel 240. First, the probe 20 must be maintained in a constant position with respect to the wheel 240, i.e. the probe 20 must be maintained at the same wheel contact point. Second, data indicative of the position in space of the wheel contact point as the tire is rotated must be accumulated and used to calculate information relating to the plane of rotation of the wheel 240.

Figure 8:
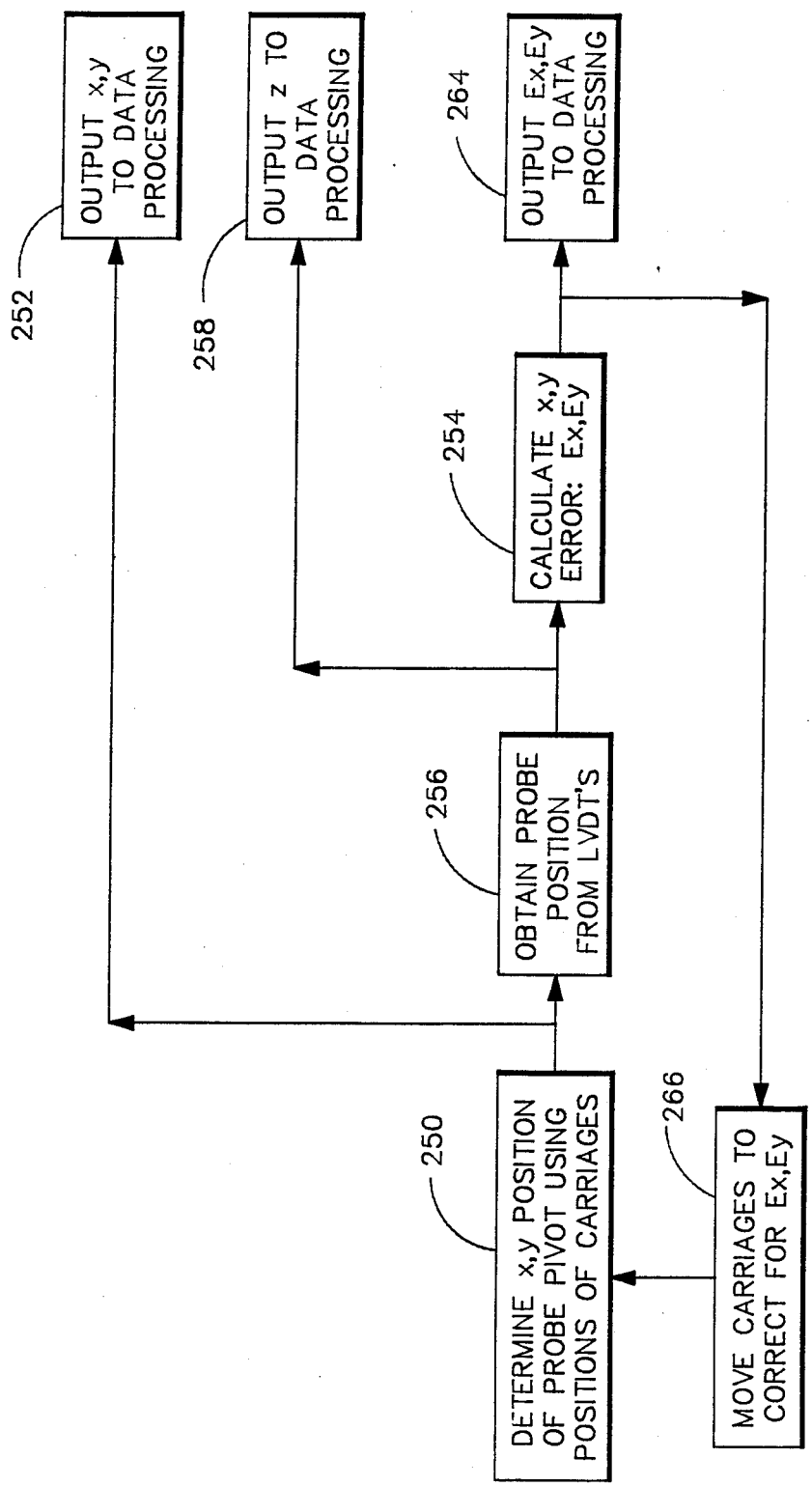
FIG. 8 is a flow diagram of the tire tracking servo loop.

The method of maintaining the probe 20 in aligned contact with the same wheel contact point will first be described. The positioning device 122 is maintained in an active state so that the probe 20 is constantly urged in a direction towards the wheel 240. Referring to the chart of FIG. 8, the position of the first and second carriages, or the X and Y carriages, 14, 18, respectively, at any one time is known using the motor shaft encoders that communicate 47, 101 with the drive shafts 36, 92, respectively. Based on the positions of the carriages 14, 18, the X, Y position of the wobble plate tilting point 131 relative to axes parallel to the bed guide rods 32, 34 and the elevator guide rods 80, 82, respectively, can be determined 250. The X, Y position thus determined is used for two purposes: it is outputted for use in the data processing steps described below in calculating the plane of rotation 252, and it is used in moving the carriages 14, 18 to maintain the probe 20 adjacent to the wheel point, as described just below.

The position of the probe 20 at any time can be obtained using the LVDT's 164-168, 256. Data from the LVDT's can be used to calculate X, Y errors or deviations from the preferred orientation 254, as described below. In addition, the signals 180, 178, 176 provided by the LVDT's 164-168 are used to obtain an indication of the amount of displacement of the wobble plate titling point 131 in a direction relative to the biasing device 122. This displacement can occur because, for example, the wheel plane of rotation is not parallel to the X, Y plane (i.e. the plane parallel to both the elevator guide rods 80, 82 and the bed guide rods 32, 34). Movement of the probe tip 150 in this direction is denoted as Z, and is depicted in FIG. 4, with the magnitude of Z being exaggerated for easier understanding of the illustration. It is recognized that when the longitudinal axis of the probe 20 is changed during a z-displacement of the tilting point 131, the z-displacement of the tilting point 131 will be slightly different from the z-displacement of the probe tip 150. Although it is possible to use displacements indicated by the LVDT's 170, 172, 174 to calculate the true probe tip displacement, in a preferred embodiment, the z-displacement of the tilting point 131 is assumed to be equal to the probe-tip displacement. The magnitude of Z is outputted to the electrical apparatus for desired data processing, 258.

Figure 5:
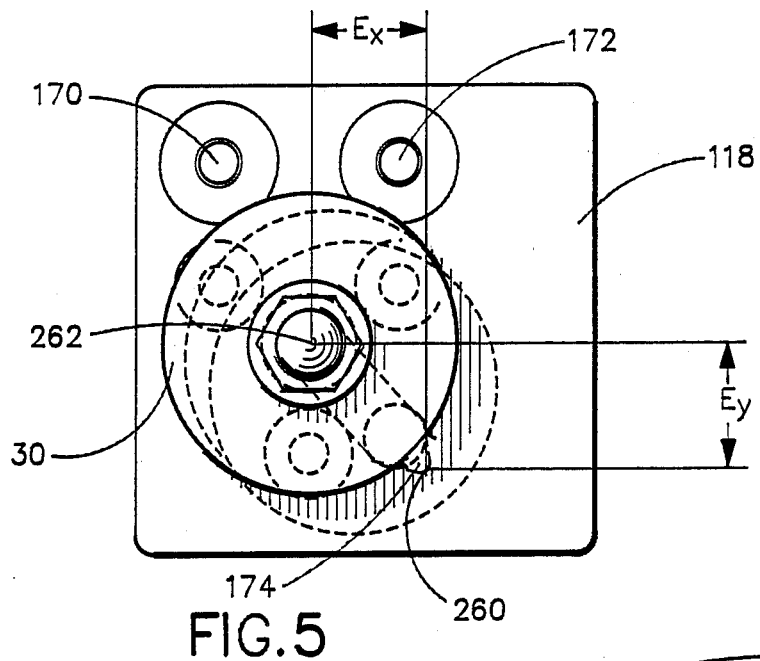
FIG. 5 is a rear elevational view of the apparatus depicted in FIG. 4 with the probe and wobble plate in a displaced position shown in phantom lines.

The X and Y errors, $E_x$, $E_y$, are calculated in the following manner. As best seen in FIG. 5, $E_x$ is the displacement in a direction parallel to the X axis (i.e., an axis parallel to the bed guide rods 32, 34) of the probe tip position 260 compared to the position the probe tip would occupy if the probe were in the preferred position 262. Similarly, $E_y$ is the displacement in a direction parallel to the Y axis (i.e., an axis parallel to the elevator guide rods 80, 82) of the probe tip position 260 with respect to the position the probe tip would have if the probe were in the preferred position 262.

Referring now to FIG. 4, it is possible to express $E_x$ and $E_y$ as $$E_x \approx L \sin P_x$$

$$E_y \approx L \sin P_y$$

where L is the known distance from the center of play 131 to the probe contact point 150. In one embodiment, L is about 1.73 inches. In the preferred embodiment, $P_x$ and $P_y$ are not measured or calculated. Instead, $E_x$ and $E_y$ are found from the known geometry of the probe 20 and attachment points 158, 160, 162, combined with distances indicated by the LVDT's 170, 172, 172. When the apparatus is arranged such that the first and third attachment points 158, 162 (and, thus, the longitudinal axes of the second and first LVDT's 172, 170) lie in a horizontal plane, and the attachment points 158, 160, 162 define an equilateral triangle with a side length of R and with the tilting axis 129 passing through the centroid of the triangle, then $E_x$ and $E_y$ can be calculated as:

$$E_x = \frac{L}{R} \cdot \frac{2(D_{170} - D_{172})}{(D_{170} + D_{172})}$$

$$E_y = \frac{L}{H} \cdot \frac{D_{172} - 2 \cdot D_{174} + D_{170}}{(D_{170} + D_{172})}$$

where $D_{170}$ is the displacement indicated by the first LVDT 170; $D_{172}$ is the displacement indicated by the second LVDT 172; $D_{174}$ is the displacement indicated by the third LVDT 174; and H is the distance from attachment point 160 to a line connecting attachment points 158 and 162.

The values of $E_x$ and $E_y$ are used for two purposes. First, $E_x$ and $E_y$ are outputted to the data processing steps described below 264. Also, the values of $E_x$ and $E_y$ are used by the electrical apparatus 48 to move the X and Y carriages 14, 18 so as to return the probe 20 to the preferred orientation 266. The probe 20 is returned to the preferred orientation for two reasons. First, for the reasons described, it is desired to maintain the probe contact point 150 adjacent to the wheel point as the wheel rotates. By continually moving the first and second carriages 14, 18 so as to move the probe 20 towards the preferred position, as the probe tip 150 is moved, relative to the tilting point 131, by virtue of the friction between the rotating tire and the contact point 150, the electrical apparatus 48 is used to move the tilting point 131 to "keep up with" the movement of the wheel point.

Second, as described below, the X, Y position of the tilting point 131 is used in the data processing scheme, described more fully below, as an indicator of the X, Y position of the wheel contact point. As can be seen from FIGS. 4 and 5, if the probe 20 is not in the preferred position, the probe pivot X, Y position differs from the wheel contact point X, Y position by an amount equal to $E_x$ to $E_y$, respectively. As described below, if the magnitude of $E_x$ or $E_y$ is too large, i.e., greater than predetermined maximum values, the X, Y data point will be ignored, i.e. will not be used for calculating the wheel plane of rotation. Therefore, in order to obtain data points, the orientation of the probe 20 should be repeatedly corrected in order to maintain $E_x$, $E_y$ at small values.

Figure 9A:
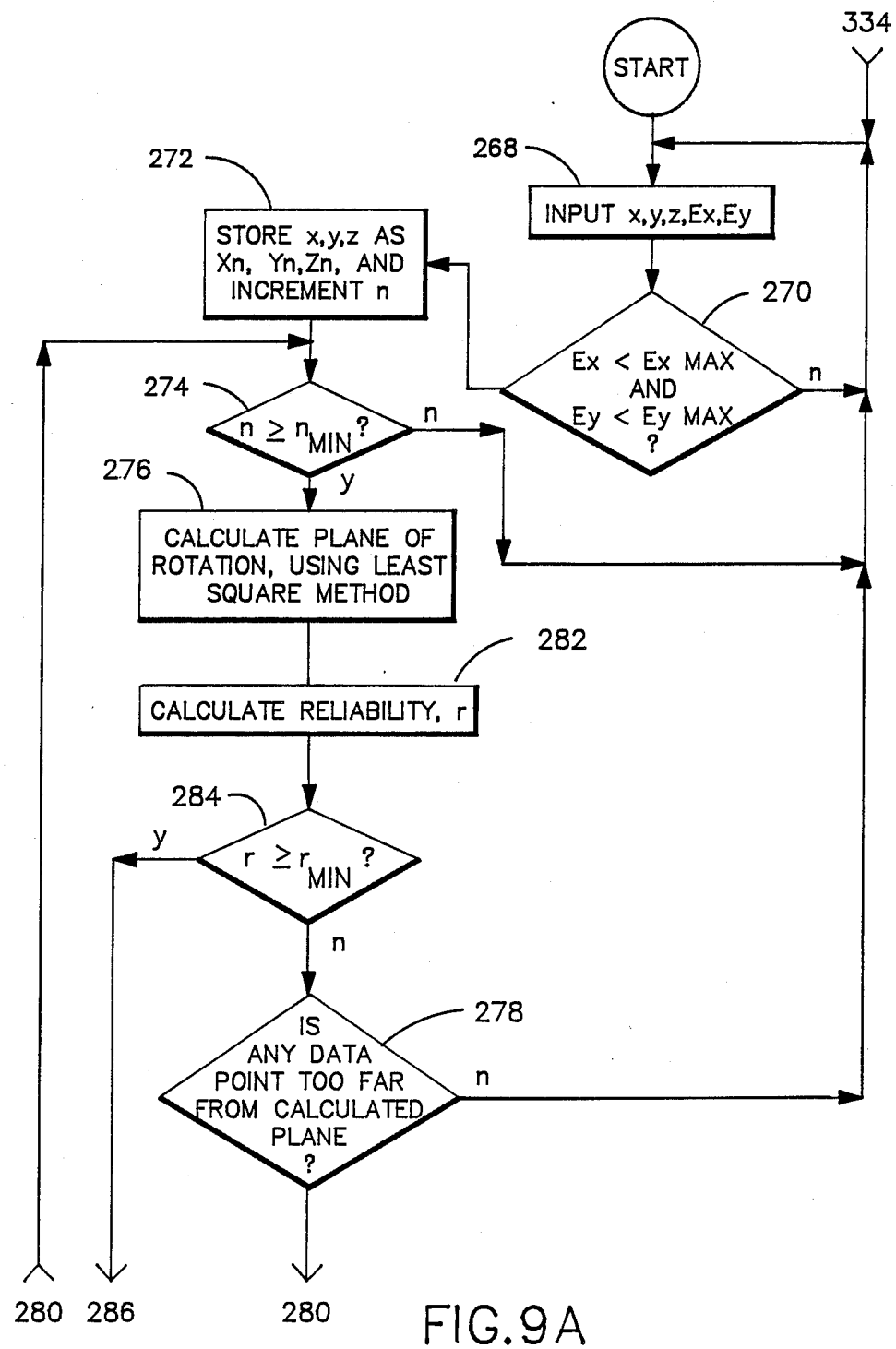
FIG. 9 is a flow chart of data acquisition and processing for one embodiment of the present invention.
Figure 9B:
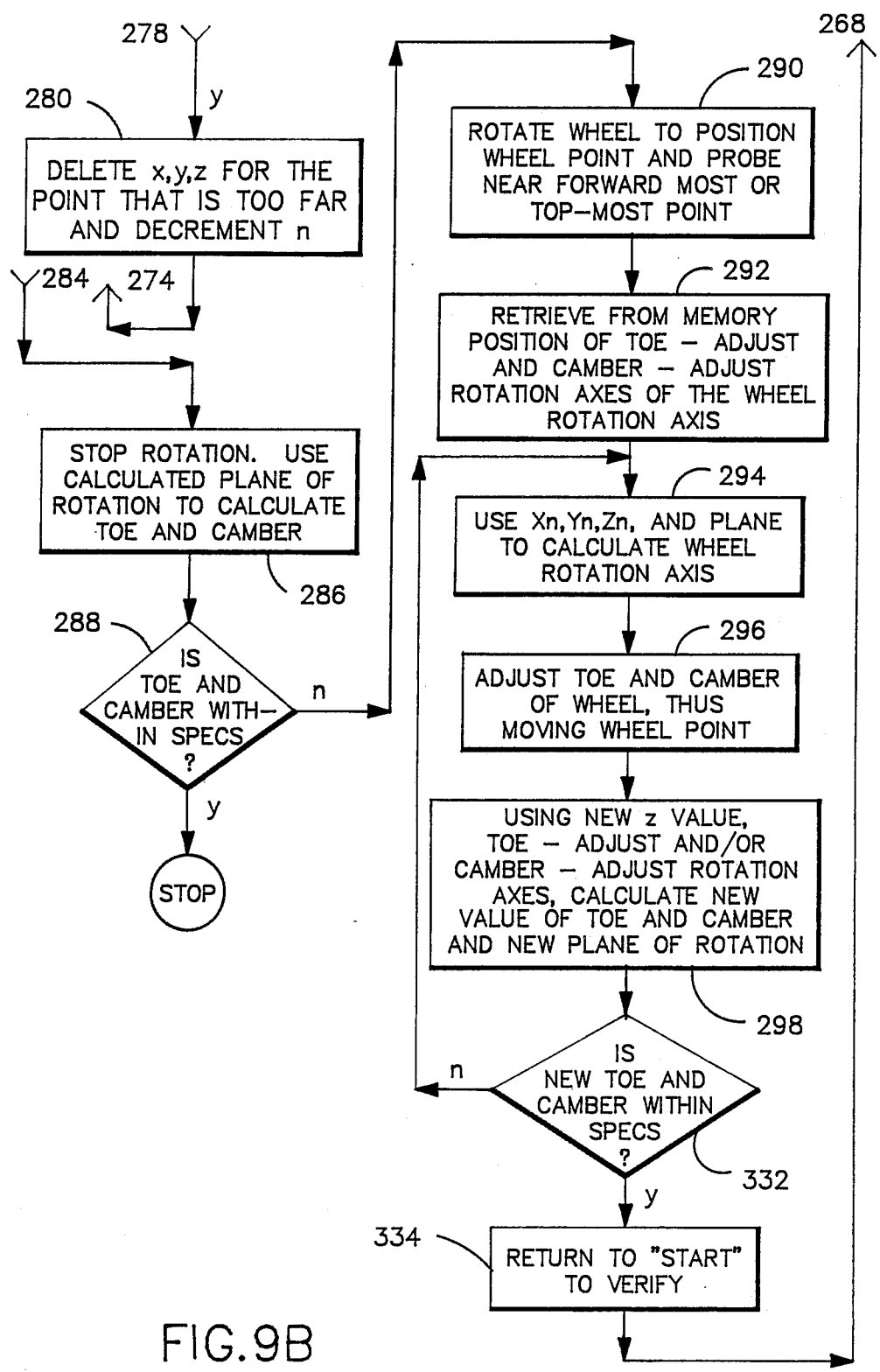

The manner in which the plane of rotation of the wheel is calculated will now be described. Referring now to FIG. 9, values of X, Y, Z, $E_x$ and $E_y$, obtained as described above, are input into the electrical apparatus 48, e.g. a computer. The magnitude of $E_x$ and $E_y$ are compared to maximum tolerable values of $E_x$ and $E_y$, $E_{x\ max}$, $E_{y\ max}$ 270. If $E_x$ is greater than $E_{x\ max}$ or $E_y$ is greater than $E_{y\ max}$, the probe is not substantially in the preferred position, and no further use is made of the X, Y, Z data. The data processing scheme then returns to the input of a new set of values 268. If $E_x$ is less than $E_{x\ max}$ and $E_y$ is less than $E_{ymax}$, the values of X, Y, and Z are stored as $X_n$, $Y_n$, and $Z_n$ and the value of n is incremented 272. N thus represents the number of sets of X, Y, Z data points which have been stored. The value of n is compared to the minimum number of data points needed $n_{min}$ 274. At least three points in space, each defined by values of X, Y and Z, are needed in order to geometrically define a plane. Preferably, more than three data points are accumulated before attempting to define a plane. By using more than three data points, it is possible to obtain not only the orientation of a plane, but a measure of reliability of the data, e.g., as described below.

If fewer than $n_{min}$ data points have been obtained, the procedure returns to an input of further data points 268. If at least $n_{min}$ data points have been obtained, the n data points are used to calculate a plane of rotation of the wheel 240. Preferably the plane of rotation is optimally defined, i.e., such that the defined plane is the best fit to the data points, according to some geometric criterion. One method of optimally defining a plane of rotation using n data points is to use the least squares method 276. According to this method, it is possible to calculate that plane which is closest to the n data points, i.e. such that the sum of the squares of all orthogonal distances from the data points to the plane is minimum.

According to one embodiment of the invention, once a plane is calculated, a measure of reliability r is calculated 282. One method of assessing reliability involves using the previously-calculated sum of the squares as a measure of reliability of the data, since a smaller sum indicates data points which are closer to the calculated plane. Other measures of reliability can also be used, such as variance and the like.

The measure of reliability r, which has been calculated, is compared to a reference value $r_{min}$ which represents the smallest amount of reliability which is acceptable 284. Preferably, $r_{min}$ is chosen so that the largest error in toe and camber which could result is less than the vehicle manufacturer-specified tolerance for toe and camber. If r is less than $r_{min}$, procedures can be instituted for obtaining a more reliable calcuation of the plane of rotation. One method for increasing reliability involves elimination of data points which are far from the calculated plane of rotation, or "outlyers". This can be accomplished by calculating the distance of each point from the calculated plane. This distance $d_n$ is compared to a maximum allowable distance $d_{max}$. In some instances it may be preferable to eliminate that data point which is farthest from the calculated plane. If $d_n$ is greater than $d_{max}$, or is the point farthest from the calculation plane, the data point n is considered an outlyer, the corresponding coordinates of the data point $X_n$, $Y_n$, $Z_n$ are deleted and the value of N is decremented 280. The process then returns to a determination of whether there are sufficient points, i.e., whether N is greater than $N_{min}$ 274, followed by a new least squares plane calculation 276.

Another method for increasing reliability involves generating more data points by continued rotation of the tire and gathering of data as described above.

After the plane of rotation, which has been determined to be at least minimally reliable, has been calculated, the rotation of the wheel can be stopped and the calculated plane of rotation can be used, in turn, to calculate the toe and camber of the wheel 286. Typically less than a full rotation of the tire will suffice to obtain a reliable indication of the plane of rotation. Once the toe and camber angles with respect to the measuring device are known, it is possible to calculate the toe and camber angles with respect to the plane of reference. Preferably the toe and camber of all wheels is obtained and a plane of reference is calculated in the following manner.

The stored values of $X_n$, $Y_n$, and $Z_n$ and the calculated plane of rotation are used to calculate the axis of rotation of the wheel 294. The orthogonal projection of the points $X_n$, $Y_n$, $Z_n$ onto the calculated plane of rotation are calculated. A circle which best fits the location of these points can be found by known techniques. The wheel rotation axis is calculated to be a line perpendicular to the plane of rotation passing through the center of the calculated circle.

The projection of the two drive wheel axes of rotation onto a horizontal plane is calculated. If the projections of the drive wheel axes of rotation are parallel, the reference plane is any vertical plane perpendicular to the horizontal projection of the drive wheel axes of rotation. If the horizontal projections of the drive wheel axes of rotation are not parallel, i.e. if they meet at an angle, the reference plane is the vertical plane which bisects that angle.

The toe and camber of the remaining wheels are calculated with respect to this reference plane. The toe and camber of the remaining wheels with respect to the reference plane are compared with the vehicle manufacturer's specification 288. If the toe and camber are within the manufacturer's specification, the procedure is finished. As can be appreciated from the foregoing, it need not be necessary to rotate the tire a full 360° in order to practice the method of the present invention.

If the toe and camber are not within specifications, the measured toe and camber and the specifications are used to calculate the adjustment needed to bring the toe and camber into specification and the toe and camber of the vehicle wheel is adjusted accordingly in the following manner:

For toe adjustment, the wheel is rotated, still maintaining the probe 20 adjacent to the wheel point, so as to position the probe 20 substantially in the forward-most or rearward-most position, i.e., that point which is most distant from a vertical plane through the axis of rotation 290. For camber adjustment, the wheel is rotated so as to position the probe 20 substantially in the upper-most position, i.e., that point which is most distant from the floor surface. In this way, as the toe and camber of the wheel are mechanically adjusted, the wheel point and probe experience a maximum z-displacement. Values which relate to those axes about which the wheel rotation axis pivots during toe adjustment and during camber adjustment, respectively, are obtained 292. The toe-adjust rotation axis is an approximately vertical line passing through the wheel rotation axis. The camber-adjust rotation axis is an approximately horizontal line passing through the wheel rotation axis. The toe-adjust and camber-adjust rotation axes will be different for different models of automobiles. Preferably, the values relating to the toe-adjust and camber-adjust rotation axes, such as the distances between the respective axes and a surface of a wheel, are stored in the memory of the electrical apparatus 48 or other computer. The values for the particular model of car being measured and adjusted are retrieved from memory for use as described below.

The toe and camber of the wheel are adjusted with respect to the reference plane in the normal fashion in the direction and amount which is indicated by a comparison of the calculated plane of rotation to the manufacturer's specifications 296. During adjustment of the toe and camber, indication of the new toe and camber angles are preferably continuously provided. Although it is possible to use the apparatus to obtain precise indications of the new toe and camber angles, in the preferred embodiment, only approximate indications of the new toe and camber angles are provided to the mechanic to assist the mechanic in adjusting the wheel alignment. After the mechanic has adjusted the alignment in accordance with the approximate indications provided to him, the precise alignment of the adjusted wheel can be obtained by again measuring wheel point positions. In one embodiment, the wheel is not rotated to determine the new plane of rotation after adjustment. Rather, previously obtained data points are utilized. In another possible embodiment, the wheel is rotated a desired amount to obtain further data points to be used in defining the new wheel plane.

Figure 10A:
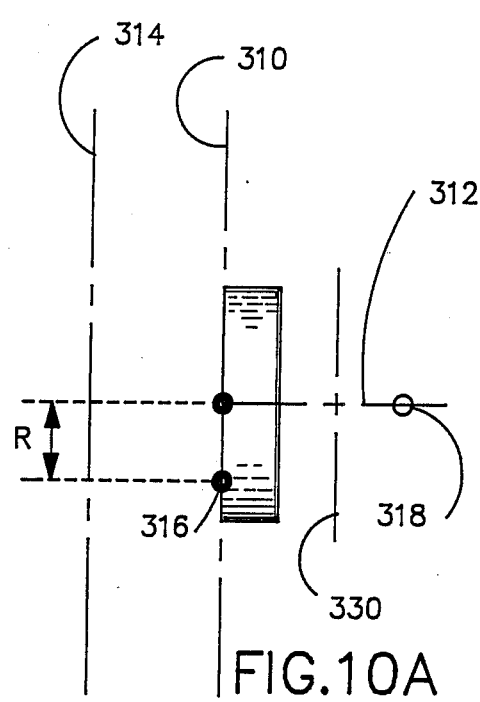
FIGS. 10A-10B are schematic top views of a wheel and a toe-adjusted wheel, respectively.
Figure 10B:
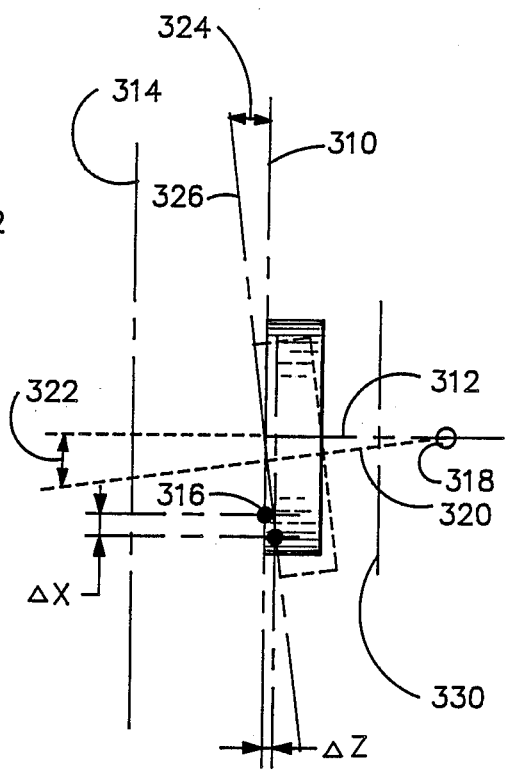
Figure 11A:
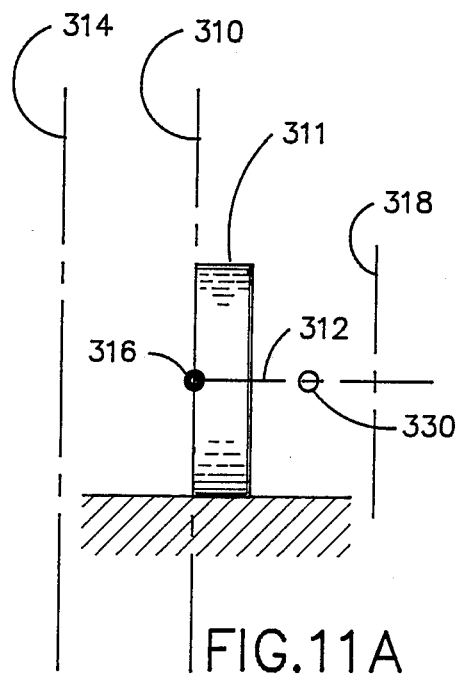
FIGS. 11A-11B are schematic side views of the wheel and the toe-adjusted wheel.
Figure 11B:
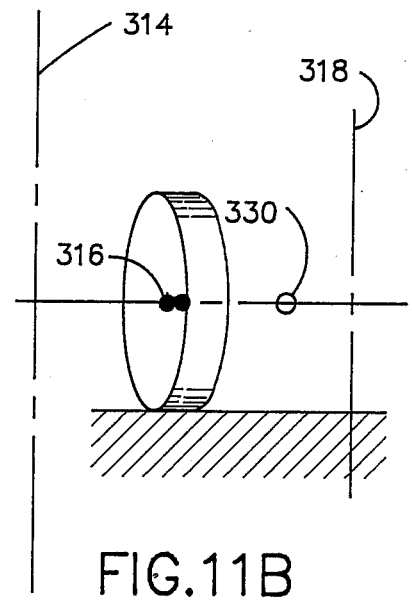

A description of the adjustment of the toe angle is first provided. The toe angle is adjusted and the new toe angle value for the wheel plane of the adjusted wheel is calculated 298 in the following manner. Referring now to FIGS. 10A and 11A, illustrating the conditions before any adjustment of the toe, the calculated wheel plane 310 of the wheel 311 is perpendicular to the wheel axis of rotation 312 and in a known relationship to the reference plane 314. For clarity of illustration, the reference plane 314 in FIG. 10 is depicted as parallel to the initial wheel rotation plane 310. As noted above, the probe is positioned substantially adjacent to, e.g., the forward-most point 316 of the wheel 311. As depicted in FIGS. 10B and 11B, when the toe is adjusted, the wheel rotation axis 312 is pivoted about the toe-adjust rotation axis 318. This causes movement of the wheel point 316 in the Z direction by an amount equal to $\Delta Z_T$ and in the X direction by an amount equal to $\Delta X$, as depicted in FIG. 10B, the toe adjustment being exaggerated in this figure for clarity. Although it is possible to use both of the values of $\Delta Z_T$ and $\Delta X$ in calculating the new toe angle, the value of $\Delta X$ is typically small and is preferably ignored during this calculation, as described below.

The position of the new axis of rotation 320 with respect to the old axis of rotation 312 can be characterized by an angle 322. When the toe-adjust axis 318 is perfectly vertical, as illustrated in FIGS. 10 and 11, the angle 322 will lie in a horizontal plane. For some models of cars, the toe-adjust rotation axis 318 will be slightly inclined to the vertical. In these types of cars, adjustment of the toe angle will also cause some change in the chamber angle. The amount of change in the camber angle can be calculated from the known amount of inclination of the toe-adjust rotation axis 318 from the vertical, using well known geometric relationships. This change in the camber angle can also be provided to the mechanic, e.g., as a continuous display or printout. For clarity of understanding, the following description relates to situations in which the toe-adjust rotation axis is vertical and the camber-adjust rotation axis is horizontal. In this situation, the angle 324 is approximately $$\text{Arcsin} = \frac{Z_T}{2r},$$

where r is the distance from the wheel point 316 to the axis of rotation 312. The magnitude of the angle 322 is the same as the magnitude of the angle 324 between the new wheel rotation plane 326 and the old wheel rotation plane 310. This angle 324 can be used to calculate the orientation of the new plane of rotation 326 with respect to the reference plane 314. Using the orientation of the new wheel rotation plane 326 with respect to the reference plane, the new toe angle is calculated and is provided by, for example, a display or printout made available to the mechanic who is adjusting the toe. The new toe angle is compared to the manufacturer's specification to determine whether the wheel orientation is now within the manufacturer's specification 332.

When it is desired to also adjust the camber angle, the probe is preferably positioned at the upper-most or lower-most (most preferably the upper-most) position on the wheel or tire. The camber of the wheel is adjusted in the normal fashion in the direction and amount which is indicated by comparison of the calculated new plane of rotation to the manufacturer's specifications. As the camber is adjusted, the wheel rotation axis 312 is pivoted about the camber-adjust rotation axis 330. This causes movement of the wheel 316 in the Z direction by an amount equal to $\Delta Z_c$ (not shown) and the Y direction by an amount equal to $\Delta Y$ (not shown). The value of $\Delta Y$ is typically small and is preferably ignored during this calculation. The position of the angle of the new axis of rotation with respect to the old axis of rotation can be found using known geometric relations. When the camber-adjust rotation axis is horizontal, this angle will lie in a vertical plane. This angle can be used to calculate the orientation of the new plane of rotation with respect to the reference plane 314. Using the orientation of the new wheel rotation plane with respect to the reference plane, the new camber angle is calculated and is provided by, for example, a display or printout made available to the mechanic who is adjusting the camber. When the camber-adjust rotation axis is not in a horizontal plane, adjustment of the camber angle will also affect the toe angle and this adjustment can be calculated and provided to the mechanic as a continuous display or printout.

The process of adjusting the toe and camber and using the values of $\Delta Z_T$ and $\Delta Z_c$ to calculate new toe and camber angles is iterated as many times as necessary to obtain a wheel orientation which is within the manufacturer's specification, as indicated by the new plane calculation process, 290-298. When the calculated new toe and camber angles are within specifications, the process can be terminated. If however, it is desired to re-check the wheel alignment following an adjustment, the above-described process of rotating the wheel and maintaining the probe adjacent to the wheel point to calculate a plane of rotation for comparison to the manufacturer's specifications 268-288 can be repeated 334. Repetition of steps 268-288 is useful in audit procedures in order to verify that the wheel has been adjusted such that the wheel is within the manufacturer's alignment specifications. The audit can be accomplished in a relatively short time while the probe is already in contact with the wheel, as it remained in contact during the adjustment. Furthermore, the wheel need be rotated only a small fraction of the 360° of full rotation in order to obtain sufficient data points for determining the wheel plane as part of the audit procedure.

As can be appreciated, adjustments made to these wheel-related angles can also be made while the wheel is rotating.

The manner of using the apparatus depicted in FIG. 7 is now described. The wheel or tire is positioned adjacent to the apparatus, preferably in a known orientation with respect to the apparatus. The probe 20 is moved adjacent to a point of the wheel spaced from the axis of rotation and urged by the spring 212 toward the wheel so that the tip of the probe 200 is adjacent to and in contact with the wheel point. The wheel is then rotated on, for example, a treadmill or rollers. The force of the probe 200 against the wheel is sufficient that the static friction between the wheel and the probe prevents any slippage of the tip of the probe 200 relative to the surface of the tire. In this way, as the wheel is rotated, the probe 200 remains adjacent to the wheel point, moving the probe and causing the arms 206, 204 to pivot about the first and second axes 205, 216. Because the arms are balanced about the pivot points, little resistance to pivoting of the arms needs to be overcome in order to maintain the probe 200 adjacent to the wheel point.

As the arms pivot about the axes 216, 205, the encoders 218, 224 provide signals 219, 225 indicating the changes in angles between the first and second arms 206, 204 and the second arm and base 204, 202. By knowing these two angles, and the distances between the first and second and second and third axes, known geometric relationships can be used to calculate the position of the probe 200 with reference to an X-Y plane, i.e. a plane perpendicular to the first, second and third axes 205, 216, 211. Simultaneously, the LVDT 208 provides a signal 213 which can be used to calculate the displacement of the probe 200 in a direction along the first axis 211, i.e. the Z displacement. Thus, the apparatus of FIG. 7 provides signals which can be used to calculate the X, Y and Z coordinates of the tip of the probe 200, and thus of the wheel point, as the wheel rotates. These data are used in the same way as the X, Y, Z data obtained using the first embodiment.

As is apparent from the above discussion, a number of advantages are obtained from the present invention. The plane of rotation of a wheel is measured with high accuracy. Because the probe is maintained adjacent to a single point on the wheel, the measured plane of rotation is unaffected by variations in the wheel surface, such as bulges or raised lettering, or by runout of the wheel. There is no need to manually align the probe apparatus with respect to the wheel or automobile for each measurement because the probe is in a predetermined position. There is no need to move or rotate the wheel an exact desired amount, such as 180°. There is no necessity for translating the wheel axis of rotation as the wheel is rotated. A measure of reliability of the wheel plane measurement is provided and any number of additional data points can be obtained as needed to provide for a desired level of reliability of measurement. This is at least partly because the method and apparatus of the present invention is theoretically capable of generating an infinite number of data points without the necessity for moving the probe with respect to the wheel between sets of data points.

A number of variations and modification of the described method and apparatus can be used. Although the apparatus can be used without translation of the axis of rotation, the method and apparatus can also be used with translation of the axis if desired. The X, Y, Z coordinate system described can be modified to a non-orthogonal coordinate system. Calculation of quantities, as described, can be accomplished by or assisted by automatic computing machines such as computers and the like. The carriages can be moved by other than a motor and drive shaft, e.g. by a linear actuator, coupled with an LVDT. Movement of the probe towards the tire can be accomplished by means other than a compressed air biasing device or a spring, for example, by a linear actuator. The values of $E_x$ and $E_y$ could be used to calculate the position of the probe point with respect to the wobble plate pivot point. Similarly, a value of $E_z$ can be calculated to correct for the difference between the measured Z value and the value which Z would have if the probe were in the preferred orientation. Although the toe and camber adjustments are described above as being conducted without rotating the wheel, it is also possible to rotate the wheel while making toe and camber adjustments. The probe depicted in FIG. 7 can be coupled with guide rods and end plates to assure that the probe 200 moves precisely along its longitudinal axis.

Although the present invention has been described with reference to certain embodiments, it should be appreciated that further modifications can be effected within the spirit and scope of the invention.

What is claimed is:

1. A method useful in measuring alignment parameters of a single wheel rotatable about an axis comprising:
    positioning a probe adjacent to a wheel point while the wheel is in a first rotational position, said wheel point being spaced from the axis;
    measuring first, second and third quantities using said probe;
    determining a first position in space of said wheel point relative to a reference plane using said first, second and third quantities;
    rotating the wheel about the axis to a second rotational position while moving said probe to maintain said probe adjacent to said wheel point;
    measuring fourth, fifth and sixth quantities using said probe;
    determining a second position in space of said wheel point relative to said reference plane using said fourth, fifth and sixth quantities;
    rotating the wheel about the axis to a third rotational position while moving said probe to maintain said probe adjacent to said wheel point;
    measuring seventh, eighth and ninth quantities using said probe;
    determining a third position in space of said wheel point relative to said reference plane using said seventh, eighth and ninth quantities; and
    determining quantities related to defining the plane of rotation of the single wheel relative to a reference plane using said first, second and third positions in space.

2. A method useful in measuring alignment parameters of a wheel rotatable about an axis, comprising:
    positioning a probe adjacent to a wheel point spaced from the axis;
    rotating the wheel about the axis;
    maintaining said probe adjacent to said same wheel point during rotation of the wheel;
    preventing substantial translational movement of the axis of rotation of the wheel; and
    determining a plurality of three-dimensional coordinate positions of said wheel point, said positions relating to defining a plane of rotation of the wheel using said probe.

3. A method, as claimed in claim 2, wherein:
    said step of determining a plurality of three-dimensional coordinate positions of said wheel point includes optimally defining a plane using at least some of said three-dimensional coordinate positions.

4. A method, as claimed in claim 3, wherein:
said step of determining a plurality of three-dimensional coordinate positions of said wheel point includes using a least squares technique for defining the plane of rotation of the wheel.

5. A method, as claimed in claim 2, wherein:
said step of determining a plurality of three-dimensional coordinate positions of said wheel point includes checking at least some of said three-dimensional coordinate positions to determine whether they are acceptable for use in defining the plane of rotation of the wheel.

6. A method, as claimed in claim 2, wherein:
said step of positioning said probe includes providing a wobble plate connected to said probe, said wobble plate being movable relative to an axis through said wobble plate.

7. A method, as claimed in claim 6, wherein:
said step of maintaining said probe includes monitoring the position of at least one of said probe and said wobble plate and causing said wobble plate to move for use in maintaining said wobble plate substantially in a predetermined position.

8. A method, as claimed in claim 7, wherein:
said step of maintaining said wobble plate substantially in a predetermined position includes moving carriage means in determined directions.

9. A method, as claimed in claim 8, wherein:
said step of moving carriage means includes moving a first carriage in a first direction and a second carriage in a second direction.

10. A method, as claimed in claim 7, wherein:
said step of maintaining said wobble plate in a predetermined position includes comparing said predetermined position with the actual position of one of said probe and said wobble plate.

11. A method, as claimed in claim 10, wherein:
said step of determining a plurality of three-dimensional coordinate positions of said wheel point includes rejecting the use of three-dimensional coordinate positions when a difference between said predetermined position and said actual position is greater than a predetermined magnitude.

12. A method, as claimed in claim 6, wherein:
said step of determining a plurality of three-dimensional coordinate positions of said wheel point includes using a difference between a predetermined position and an actual position of one of said probe and said wobble plate.

13. A method, as claimed in claim 2, wherein:
said step of maintaining said probe includes using only the rotation of the wheel in moving said probe with the wheel.

14. A method, as claimed in claim 2, wherein:
said step of positioning said probe includes providing a first arm having a first axis of rotation and a second arm having a second axis of rotation.

15. A method, as claimed in claim 14, wherein:
said step of maintaining said probe includes rotating said first and second arms about their respective axes of rotation.

16. A method useful in measuring alignment parameters of a wheel rotatable about an axis, comprising:
positioning a probe adjacent to a wheel point spaced from the axis, said step of positioning said probe includes providing a first arm having a first axis of rotation and a second arm having a second axis of rotation;
rotating the wheel about the axis;
maintaining said probe adjacent to said same wheel point during rotation of the wheel, said step of maintaining said probe includes rotating said first and second arms about their respective axes of rotation;
preventing substantial translational movement of the axis of rotation of the wheel; and
determining information relating to defining a plane of rotation of the wheel using said probe, said step of determining information includes obtaining position-related data relating to angles being defined using said first and second arms.

17. A method useful in measuring alignment parameters of a single wheel rotatable about an axis, comprising:
positioning a probe adjacent to a wheel point of the single wheel, said wheel point being spaced from the axis;
rotating the single wheel about the axis;
maintaining said probe adjacent to said same single wheel point;
sensing a pluraltiy of three-dimensional coordinate positions of said wheel point using only the single wheel; and
determining the plane of rotation of the single wheel using said plurality of three-dimensional coordinate positions.

18. A method, as claimed in claim 17, wherein:
said step of positioning said probe includes providing a probe having a longitudinal axis and said step of maintaining said probe includes preventing substantial rotation of said probe about said probe longitudinal axis.

19. A method, as claimed in claim 17, wherein:
said step of positioning said probe includes providing a probe having a single contact point for use in contacting a point on the wheel.

20. An apparatus useful in measuring alignment parameters of a wheel rotatable about an axis while relying only on information obtained from this same, single wheel, comprising:
probe means including a probe, said probe being located adjacent to the wheel, said probe being maintained in substantially the same position relative to the wheel during the rotation thereof;
means, responsive to said probe means, for detecting the position of said probe means and generating three-dimensional coordinate information for a plurality of probe positions during rotation of the wheel; and
means for processing said three-dimensional coordinate information received from said means for detecting to determine the plane of rotation of the wheel.

21. An apparatus, as claimed in claim 20, further comprising:
means for rotating the wheel.

22. An apparatus, as claimed in claim 20, wherein:
said probe means includes a wobble plate connected to said probe, said wobble plate being pivotal about a point.

23. An apparatus, as claimed in claim 20, wherein:
said probe includes a single contact point for contacting the wheel.

24. An apparatus, as claimed in claim 22, wherein:

said means for detecting includes a plurality of sensing devices operatively associated with said wobble plate.

25. An apparatus, as claimed in claim 24, wherein: each of said sensing devices includes an elongated detecting rod adjustable in a direction along its longitudinal axis.

26. An apparatus, as claimed in claim 20, wherein: said means for processing includes means for determining a plane of rotation by optimally fitting said plane to a plurality of three-dimensional coordinate positions.

27. An apparatus, as claimed in claim 26, wherein: said means for determining includes means for implementing a least squares method for use in defining a plane.

28. An apparatus, as claimed in claim 20, further including: means for moving said probe in at least two mutually orthogonal directions.

29. An apparatus, as claimed in claim 28, wherein: said means for moving includes a first carriage for moving said probe in a first direction and a second carriage operatively connected to said first carriage for moving said probe in a second direction.

30. An apparatus, as claimed in claim 20, further including: means for positioning said probe adjacent to the wheel.

31. An apparatus, as claimed in claim 30, wherein: said means for positioning includes a movable rod connected to said probe means.

32. An apparatus, as claimed in claim 20, further including: means for moving said probe including a first rotating arm and a second rotating arm.

33. An apparatus, as claimed in claim 32, wherein: said means for moving includes a first counter-weight operatively associated with said first arm and a second counter-weight operatively associated with said second arm.

34. An apparatus useful in measuring alignment parameters of a wheel rotatable about an axis, comprising:
probe means including a probe, said probe being positioned adjacent to the wheel and maintaining the same position relative to the wheel during rotation thereof;
means, responsive to said probe means, for detecting the position of said probe means and generating three-dimensional coordinate information for a plurality of probe positions during rotation thereof; and
means for processing said three-dimensional coordinate information received from said means for detecting during rotation of the wheel, said means for processing including means for obtaining information relating to the point of the rotation of the wheel and also including means for determining the plane of rotation that best fits said position-related information.

35. An apparatus useful in measuring alignment parameters of a wheel rotatable about an axis while relying only on information obtained from this same, single wheel, comprising:
probe means including a probe, said probe being located adjacent to the wheel, said probe being maintained in substantially the same position relative to the wheel during rotation thereof;
means for moving said probe in at least two mutually orthogonal directions, said means for moving includes a first carriage for moving said probe in a first direction and a second carriage operatively connected to said first carriage for moving said probe in a second direction;
means, responsive to said probe means, for detecting the position of said probe means and generating position-related information during rotation of the wheel, said means for detecting including a first sensor for detecting the movement of said first carriage and generating position-related information indicative of said movement and a second sensor for detecting the movement of said second carriage and generating position-related information indicative of said movement; and
means for processing said position-related information received from said means for detecting to determine the plane of rotation of the wheel.

36. An apparatus useful in measuring alignment parameters of a wheel rotatable about an axis while relying only on information obtained from this same, single wheel, comprising:
probe means including a probe, said probe being located adjacent to the wheel, said probe being maintained in substantially the same position relative to the wheel during rotation thereof;
means for moving said probe including a first rotating arm and a second rotating arm;
means, responsive to said probe means, for detecting the position of said probe means and generating position-related information during rotation of the wheel, said means for detecting including a first sensor for detecting the rotation of said first rotating arm and generating position-related information indicative of said rotation and a second sensor for detecting the rotation of said second rotating arm and generating position-related information indicative of said rotation; and
means for processing said position-related information received from said means for detecting to determine the plane of rotation of the wheel.

37. An apparatus useful in measuring alignment parameters of a wheel rotatable about an axis while relying only on information obtained from the same, single wheel comprising:
probe means including a probe, said probe being located adjacent to and rotating with a point of the wheel, said probe being maintained in substantially the same position relative to the wheel during rotation thereof;

38. An apparatus useful in measuring alignment parameters for a wheel rotatable about an axis while relying only on information obtained from the same, single wheel, comprising:
probe means including a probe, said probe being located adjacent to the wheel, said probe being maintained in substantially the same position relative to the wheel during rotation thereof;
means, responsive to said probe means for detecting the position of said probe means and generating three-dimensional coordinate information during rotation of the wheel; and
means for processing said three-dimensional information received from said means for detecting wherein the axis of rotation of the wheel is determined.

39. An apparatus useful in measuring alignment parameters for a wheel rotatable about an axis while relying only on information obtained from the same, single wheel, comprising:
- means for detecting the position of a single point on the wheel during rotation of the wheel and for generating three-dimensional coordinate information for a plurality of positions of said single point during rotation of the wheel; and
- means for processing said three-dimensional coordinate information received from said means for detecting, said means for processing using substantially only information from the same, single wheel in determining the plane of rotation of the wheel.

40. An apparatus useful in measuring alignment parameters of a wheel rotatable about an axis while relying only on information obtained from the same, single wheel, comprising:
- probe means including at least one wheel contacting device having a longitudinal axis wherein the longitudinal axis of said wheel contacting device meets the wheel at an angle;
- means for maintaining said longitudinal axis substantially at said angle with respect to the wheel during rotation of the wheel;
- means, responsive to said probe means, for detecting the position of said probe means and generating three-dimensional coordinate information for a plurality of probe means positions during rotation of the wheel; and
- means for processing said three-dimensional coordinate information received from said means for detecting, said means for processing using substantially all the information from the same, single wheel in determining the plane of rotation of the wheel.

41. An apparatus useful in measuring alignment parameters of a wheel rotatable about an axis comprising:
- means for detecting a plurality of positions of a point associated with the wheel during rotation of the wheel, each of said positions being defined by a first coordinate, second coordinate and third coordinate in a three-dimensional space; and
- means for processing at least three of said positions defined by said first, second and third coordinates and received from said means for detecting, said means for processing using substantially all the information from the same point associated with the wheel in determining the plane of rotation of the wheel.

42. A method, as claimed in claim 9, wherein:
said step of determining a plurality of three-dimensional coordinate positions of said wheel point includes obtaining position-related data relating to the moving of said first carriage in said first direction and said second carriage in said second direction.

* * * * *